(12) United States Patent
Salonidis et al.

(10) Patent No.: US 7,961,702 B2
(45) Date of Patent: Jun. 14, 2011

(54) DISTRIBUTED BANDWIDTH ALLOCATION AND TRANSMISSION COORDINATION METHOD FOR QUALITY OF SERVICE PROVISION IN WIRELESS AD HOC NETWORKS

(75) Inventors: Theodoros Salonidis, College Park, MD (US); Leandros Tassiulas, Beltsville, MD (US)

(73) Assignee: University of Maryland, College Park, MD (US)

( * ) Notice: Subject to any disclaimer, the term of this patent is extended or adjusted under 35 U.S.C. 154(b) by 1466 days.

(21) Appl. No.: 10/736,909

(22) Filed: Dec. 17, 2003

(65) Prior Publication Data

US 2004/0156312 A1 Aug. 12, 2004

(51) Int. Cl.
| | |
|---|---|
| *H04B 7/212* | (2006.01) |
| *G01R 31/08* | (2006.01) |
| *H04W 4/00* | (2009.01) |
| *H04J 3/16* | (2006.01) |

(52) U.S. Cl. ......... 370/347; 370/230; 370/340; 370/468
(58) Field of Classification Search ........................ None
See application file for complete search history.

(56) References Cited

U.S. PATENT DOCUMENTS

| | | | | |
|---|---|---|---|---|
| 6,618,385 | B1 * | 9/2003 | Cousins ........................ | 370/401 |
| 6,621,805 | B1 * | 9/2003 | Kondylis et al. .............. | 370/329 |
| 6,628,670 | B1 * | 9/2003 | Galand et al. ................. | 370/468 |
| 6,665,311 | B2 * | 12/2003 | Kondylis et al. .............. | 370/462 |
| 6,724,727 | B2 * | 4/2004 | Counterman ................. | 370/235 |
| 6,934,249 | B1 * | 8/2005 | Bertin et al. .................. | 370/218 |
| 6,963,747 | B1 * | 11/2005 | Elliott ........................... | 455/450 |
| 6,990,120 | B1 * | 1/2006 | Lindgren et al. .............. | 370/468 |
| 6,999,419 | B2 * | 2/2006 | Ise et al. ........................ | 370/230 |
| 7,035,264 | B2 * | 4/2006 | Seki et al. .................. | 370/395.4 |
| 7,047,311 | B2 * | 5/2006 | Oishi et al. .................... | 709/233 |
| 7,283,494 | B2 * | 10/2007 | Hammel et al. .............. | 370/329 |
| 2003/0109253 | A1 * | 6/2003 | Fenton et al. ................. | 455/422 |

OTHER PUBLICATIONS

Baatz, S. et al., "Bluetooth Scatternets: An Enhanced Adaptive Scheduling Scheme," 2002, IEEE.
Huang, X., et al., "On Max-min Fairness and Scheduling in Wireless Ad-Hoc Networks: Analytical Framework and Implementation," MobiHOC 2001, Long Beach, CA.
Johansson, N. et al. "A Distributed Scheduling Algorithm for a Bluetooth Scatternet," International Teletraffic Congress, Sep. 2001, Salvador da Bahia, Brazil.
Johansson, N. et al., "Jump Mode—A Dynamic Window-based Scheduling Framework for Bluetooth Scatternets," MobiHOC 2001, Long Beach, CA.
Luo, H., et al., A New Model for Packet Scheduling in Multihop Networks, 2000.
Nandagopal, T., "Achieving MAC Layer Fairness in Wireless Packet Networks," MOBICOM 2000, Boston, MA.
Rácz, A. et al., "A Pseudo Random Coordinated Scheduling Algorithm for Bluetooth Scatternets," MobiHOC 2001, Long Beach, CA.
Tassiulas, L. et al., Maxmin Fair Scheduling in Wireless Networks, 2002, IEEE.

\* cited by examiner

*Primary Examiner* — Kwang B Yao
*Assistant Examiner* — Jutai Kao
(74) *Attorney, Agent, or Firm* — Squire, Sanders & Dempsey (US) LLP

(57) ABSTRACT

Methods, devices, systems, and computer programs are provided that allow for optimally allocating bandwidth in an ad hoc, wireless network configured to support at least one guaranteed feasible flow allocation. According to some of these methods, devices, systems, Quality of Service guarantees may be provided across the network. Also, in many instances, the methods are iterative and allow for convergence to an optimized bandwidth allocation.

8 Claims, 10 Drawing Sheets

| step | | $F_1$ | $F_2$ | $F_3$ | rem | Actions |
|---|---|---|---|---|---|---|
| 0 | $T_1$ | 2 | 6 | 6 | 0 | $T=14$ |
| 1 | $r_1$ | 2/14 | 6/14 | 6/14 | 0 | $r_1 = T_1 / T$ |
| 2 | $r_1$ | 0.333 | 0.333 | 0.333 | 0.000 | fluid FDC |
| 3 | $\tau_1$ | 4 | 4 | 4 | 2 | $\tau_1 = \lfloor r_1 T \rfloor$ |
| 4 | $\tau_1$ | 6 | 4 | 4 | 0 | Give remainder slots to $F_1$ |
| 5 | $x_1$ | +4 | -2 | -2 | 0 | $x_1 = \tau_1 - T_1$ |

FIGURE 6

| slot# | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| $S_1$ | $F_3$ | $F_2$ | $F_2$ | $F_3$ | $F_2$ | $F_3$ | $F_2$ | $F_3$ | $F_1$ | $F_2$ | $F_1$ | $F_3$ | $F_2$ | $F_3$ |
| $S_2$ | - | $F_4$ | $F_4$ | $F_4$ | $F_4$ | $F_4$ | $F_4$ | $F_4$ | $F_1$ | $F_4$ | $F_1$ | - | - | - |

600

DISTRIBUTED BANDWIDTH ALLOCATION AND TRANSMISSION COORDINATION METHOD FOR QUALITY OF SERVICE PROVISION IN WIRELESS AD HOC NETWORKS

BACKGROUND OF THE INVENTION

1. Field of the Invention

The present specification relates generally to methods, software, devices, and systems that may be used for allocating bandwidth in a network.

2. Description of the Related Art

A wireless ad hoc network is typically defined as a collection of nodes that spontaneously form an autonomous, all-wireless infrastructure. In wireless ad hoc networks according to the related art, data is forwarded through multiple wireless hops before reaching an intended destination. In contrast, cellular networks typically provide wireless access that is restricted to a "last hop".

A representative wireless ad hoc network 100 according to the related art is illustrated in FIG. 1. Nodes 20 in network 100 may be positioned in, for example, laptop computers, cellular phones, ships, automobiles, military vehicles, and/or airborne vehicles. By virtue of being included in mobile system, over time, each node 20 in wireless ad hoc network 100 may change its location and/or cease operating in network 100. Additional nodes, other than those illustrated in FIG. 1, may also join network 100 over time. Hence, the size and topography of network 100 varies over time.

Ad hoc wireless networks are attractive because they are flexible and fully distributed in the sense that they do not rely on a central authority to coordinate transmissions in the network. Such networks are also attractive because they typically have minimal deployment cost, can operate in unlicensed bands, allow for dynamically increasing capacity and coverage as more users are added to a network, and alleviate or eliminate the need for centralized network administration.

In addition, in certain currently available wireless ad hoc networks, such as network 100, users share a single broadcast channel via a random access protocol. Random access protocols are attractive because nodes can decide when to transmit based only on local information. On the other hand, these protocols lack coordination and, therefore can be susceptible to unpredictable interference due to, for example, transmission conflicts. This unpredictable interference renders random access protocols inappropriate for provision of Quality of Service (QoS) guarantees to the ad hoc network users. On the other hand, scheduled access methods such as TDMA achieve deterministic allocations via perfect coordination of transmissions but typically need global network knowledge to reach their goal.

At least in view of the above, what is needed are wireless ad hoc networks that are capable of providing strict bandwidth allocation and/or QoS guarantees to network users using only local information. What is also needed are methods of operating such networks. Further, what is needed are network devices capable of implementing these methods and computer-readable software products that may be used to operate the network devices.

SUMMARY OF THE INVENTION

Certain embodiments of the present invention include methods of allocating bandwidth in a first node that is operable in an ad hoc, wireless network configured to support at least one guaranteed feasible flow allocation. Some of these methods include the step of initiating a communication between the first node and a second node in the network that, together, are endpoints of a link, the communication being related to possible bandwidth allocation adjustment of a flow sharing the link. Some of these methods also include the step of determining, in the first node, a first new bandwidth allocation that approaches a first optimization condition for the flow. In addition, some of these methods include the step of communicating with the second node to determine a mutually-agreed upon optimal bandwidth allocation for the flow. Further, some of these methods include the steps of notifying neighbor nodes in the network of the mutually-agreed upon optimal bandwidth allocation when reallocation is needed and adopting the mutually-agreed upon optimal allocation for the flow when reallocation is needed.

Certain other embodiments of the present invention include network devices configured to allocate bandwidth in an ad hoc, wireless network configured to support at least one guaranteed feasible flow allocation. Some of these devices include a first communication unit configured to initiate a communication between the device and a node in the network that, together, are endpoints of a link in the network, the communication being related to possible bandwidth allocation adjustment of the link and a first processing unit configured to determine a first new bandwidth allocation that approaches a first optimization condition for a flow sharing the link, wherein the first processing unit is operably connected to the first communication unit. Some of these devices also include a second communication unit configured to communicate with the node to determine a mutually-agreed upon optimal bandwidth allocation for the flow, wherein the second communication unit is operably connected to the first communication unit. Some of these devices also include a third communication unit configured to notify neighbor nodes in the network of the mutually-agreed upon optimal bandwidth allocation when reallocation is needed, wherein the third communication unit is operably connected to the first communication unit and a second processing unit configured to adopt the mutually-agreed upon optimal allocation for the flow when reallocation is needed, wherein the second processing unit is operably connected to the first communication unit.

In addition, certain embodiments of the present invention include computer programs embodied on computer-readable media, with the computer programs configured to allocate bandwidth in an ad hoc, wireless network configured to support at least one guaranteed feasible flow allocation. According to certain of these embodiments, the computer programs may includes a first sub-routine for initiating a communication between the first node and a second node in the network that, together, are endpoints of a link, the communication being related to possible bandwidth allocation adjustment of the link and a second sub-routine for determining, in the first node, a first new bandwidth allocation that approaches a first optimization condition for a flow sharing the link. The computer programs may also include a third sub-routine for communicating with the second node to determine a mutually-agreed upon optimal bandwidth allocation for the flow and a third sub-routine for notifying neighbor nodes in the network of the mutually-agreed upon optimal bandwidth allocation when reallocation is needed. Further, the computer programs may include a fourth sub-routine for adopting the mutually-agreed upon optimal allocation for the flow when reallocation is needed.

According to yet other embodiments of the present invention, network devices configured to allocate bandwidth in an ad hoc, wireless network configured to support at least one guaranteed feasible flow allocation are provided. These devices may include initiation means for initiating a communication between the first node and a second node in the network that, together, are endpoints of a link, the communication being related to possible bandwidth allocation adjustment of the link and determination means for determining, in the first node, a first new bandwidth allocation that approaches a first optimization condition for a flow sharing the link. These devices may also include determination means for communicating with the second node to determine a mutually-agreed upon optimal bandwidth allocation for the flow and notification means for notifying neighbor nodes in the network of the mutually-agreed upon optimal bandwidth allocation when reallocation is needed. In addition, these devices may include adoption means for adopting the mutually-agreed upon optimal allocation for the flow when reallocation is needed.

BRIEF DESCRIPTION OF THE DRAWINGS

For proper understanding of the invention, reference should be made to the accompanying drawings, wherein:

FIG. 4 also includes a table that illustrates which slot positions, if any, are idle for each node on the network;

FIG. 5 illustrates a table wherein the fairness deficit computation of node 1 in FIG. 4 is depicted;

FIG. 6 includes a table that depicts the local schedules of nodes 1 and 2 in FIG. 4 when node 1 performs the slot assignment algorithm;

DETAILED DESCRIPTION OF THE PREFERRED EMBODIMENTS

Figure 1:
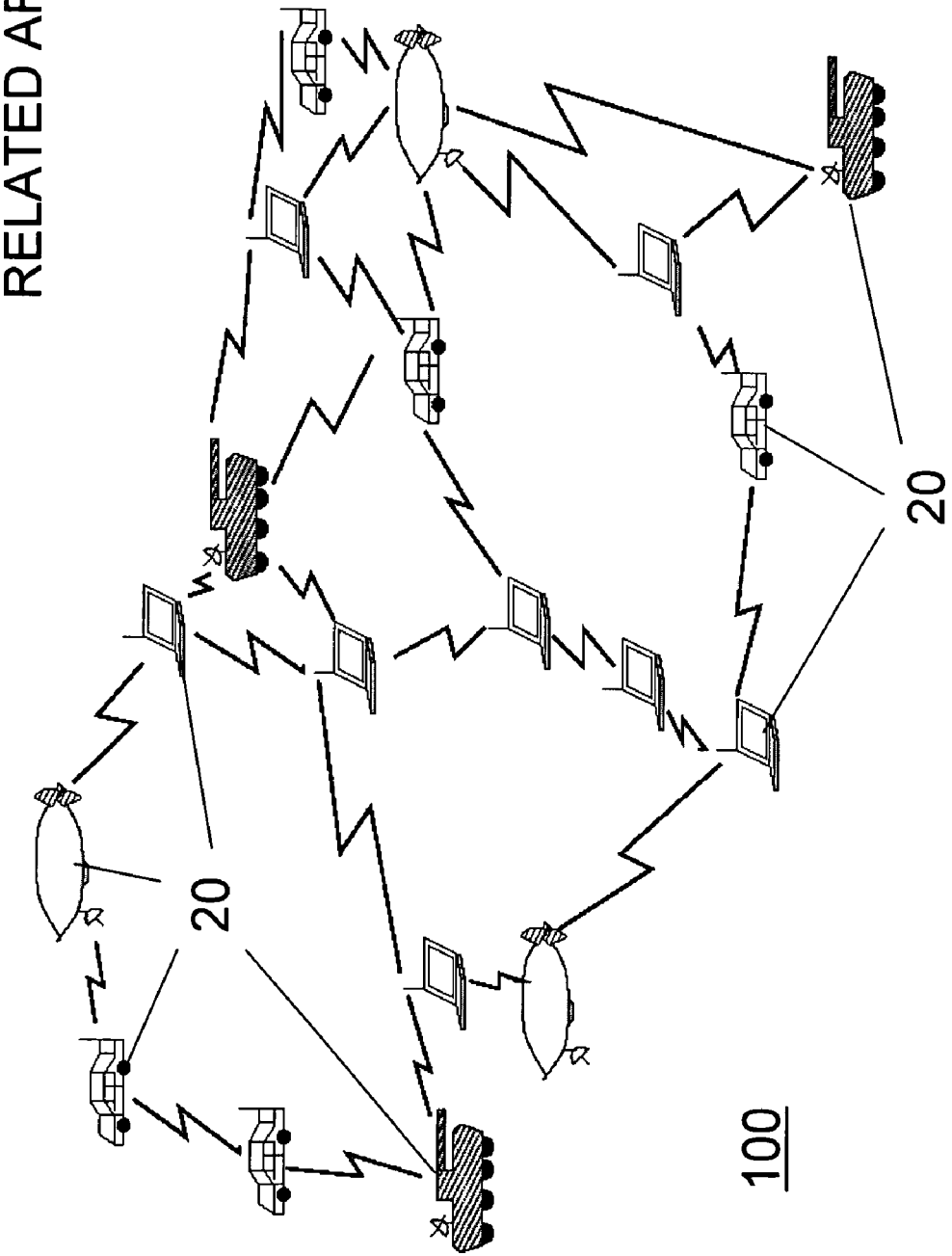
FIG. 1 illustrates a representative wireless ad hoc network according to the related art.

According to certain embodiments of the present invention, a distributed protocol is provided for wireless ad hoc networks. Preferably, the protocol is fully distributed and, typically, this protocol allocates bandwidth to the nodes of the network by maintaining coordination of transmissions between the nodes. According to certain embodiments of the present invention, perfect coordination is provided.

According to certain other embodiments of the present invention, an ad hoc network that operates under a Time Division Multiple Access (TDMA) schedule is provided. According to some of these embodiments, transmissions of data, which may take the form of, for example, packets and datagrams, on links between the nodes of the network are explicitly specified over a period of T slots.

When coordinated access (preferably perfectly coordinated access) is used, the fraction of slots a link receives within a period T determines its allocated rate in the network. In this setting, a Quality of Service (QoS) objective is satisfied as a set of desired link session rates are provided in the network.

The protocol may adapt to dynamic changes in a network. For example, link rate adjustment requests may be granted and/or topological changes in the network may be supported by modifying the network TDMA schedule on-line. According to certain embodiments, the protocol uses QoS-aware bandwidth allocation algorithms to reach a desired set of link rates in the network after a series of asynchronous link rate adjustments. The rate adjustments typically trigger incremental schedule modifications that target a schedule with the desired allocation.

The protocol can include a bandwidth allocation component that is aware of the intended QoS objective and a distributed coordination mechanism. During an asynchronous link activation for rate adjustment, the bandwidth allocation algorithm first typically finds the amount of adjustment using a rate computation algorithm. Then, a slot assignment algorithm is commonly used to determine the exact slot positions that are preferably modified in order to reflect the adjustment on the current schedule. Then, a distributed coordination mechanism may be used to ensure that the requested schedule modifications will be performed while keeping the network schedule free of transmission conflicts.

The above-described approach allows for various QoS-aware bandwidth allocation algorithms to be integrated transparently with a generic distributed coordination mechanism. According to certain embodiments of the present invention, a distributed bandwidth allocation scheme is used to establish Max Min Fair (MMF) rates in the network. Such MMF rates become particularly useful at least when network users do not have explicit bandwidth requirements and when various network users need a fair treatment by the network while getting the maximum possible bandwidth given the network constraints.

The above-discussed protocol is typically fully distributed and may be used in conjunction with slotted TDMA technologies that do not support system-wide slot synchronization. For example, the protocol may be used in conjunction with the commercially-available BLUETOOTH wireless technology.

According to certain embodiments of the present invention, protocols are provided that have very low communication and storage requirements. Typically, these requirements do not depend on the size of the intended ad hoc network, but rather on the protocol parameters such as, for example, the schedule period T.

Described below is the architecture of a representative ad hoc network according to certain embodiments of the present invention. Also described below is a representative distributed coordination mechanism and representative bandwidth allocation algorithms that may be used to drive a coordination mechanism. Further, after favorable conditions for rate feasibility in a network are defined, a specific bandwidth allocation and slot assignment method for yielding MMF schedules are described.

Representative Ad Hoc Network Architecture

In the discussion provided below, a generic architecture that may be used for a slotted wireless ad hoc network that uses multiple channels at the physical layer is presented. Hence, one of skill in the art of the claimed invention will appreciate that the methods and mechanisms described below may be directly applied to many different technologies, including the BLUETOOTH technology.

Commonly, in a multi-channel system, a pair of nodes that are in close enough proximity to be capable of communicating with each other wirelessly first establish a communication channel before transmissions take place. This channel essentially forms a point-to-point physical link between the two nodes and is often implemented either by a distinct frequency or spread spectrum code, which may be, for example, defined as a frequency hopping sequence or a Direct Sequence spreading code.

Figure 2:
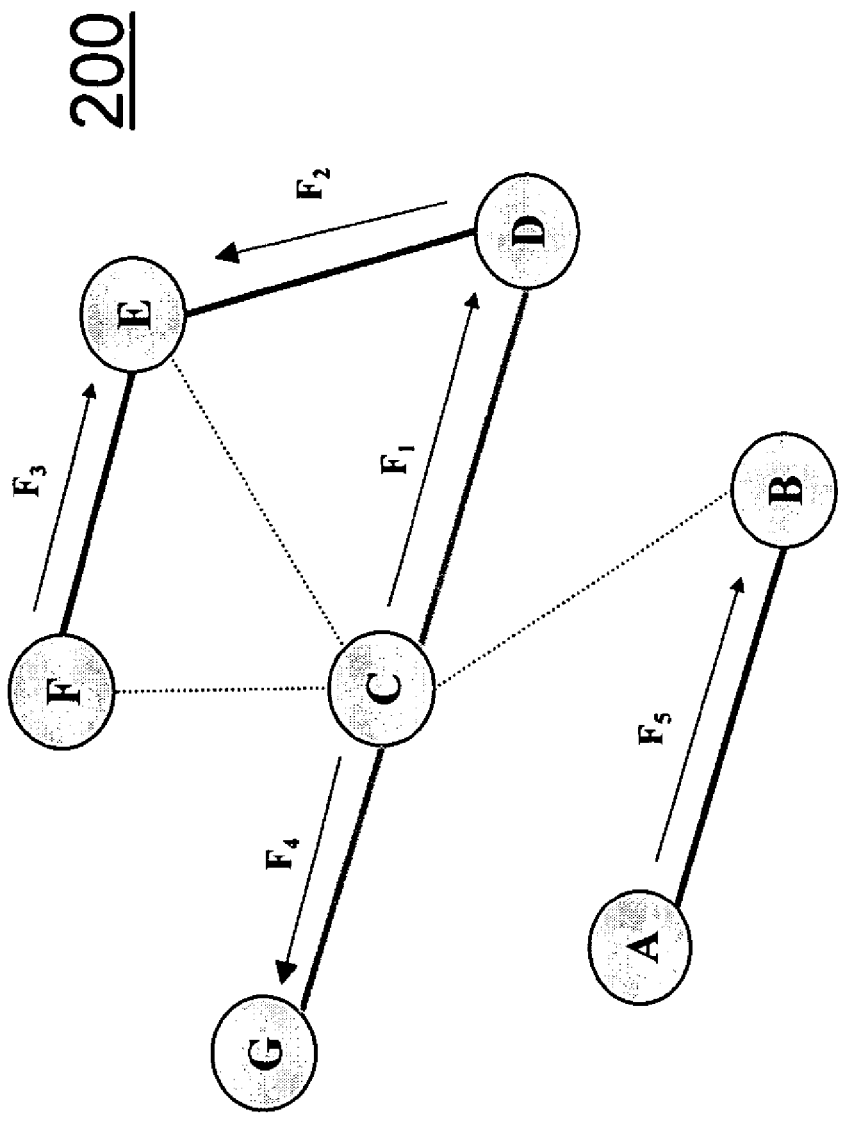
FIG. 2 illustrates a first small network according to certain embodiments of the present invention.

FIG. 2 illustrates a small network 200 according to certain embodiments of the present invention that includes seven network nodes A-G, eight physical links, illustrated as lines connecting the nodes, and five link flows $F_1$-$F_5$.

In FIG. 2, transmissions, made up of one or more link flows, that take place simultaneously on different physical links generally do not interfere with each other. It should be noted that a physical link is commonly shared by a number of single-hop sessions, referred to herein as logical link flows.

According to certain embodiments of the present invention, wireless nodes A-G have the hardware capability to transmit and/or receive data in more than one channel, which includes its adjacent physical links. However, each node A-G has limits $D_{max}$ and $F_{max}$ on the total number of physical links and logical link flows that it can maintain simultaneously. Such constraints are specific to the multi-channel technology at hand and are typically parameters that are inherent to the protocol being used.

According to certain embodiments of the present invention, a network uses time slots to allocate bandwidth to the link flows. Each slot normally has a fixed duration and supports bi-directional data transfer on a single flow. This can be achieved by dividing each slot in two half-duplex parts, either in time division duplex (TDD) or frequency division duplex (FDD). The time slot reference on a physical link is generally provided by a hardware clock of one of the endpoint nodes, which acts as "master".

In order to provide more economical nodes, wireless nodes typically, though not always, include a single radio transceiver, and therefore can participate in only one adjacent channel and link flow at a time. Each node then coordinates transmissions and allocates bandwidth to its adjacent flows using a local periodic schedule of period T. Also, each slot entry in the local schedule indicates the action of a node for the duration of a full-duplex slot. While in a given slot, a node can either be tuned on a channel and communicate on a flow of this channel or remain idle.

In FIG. 2, it is possible that nodes G and F are in wireless proximity, but that they have not established a physical link. Also, flows $F_1$ and $F_5$ may be able to transmit simultaneously without conflict, even if nodes B and D are within transmission range. This is because these flows can use different channels, or physical links, for communication. However, in FIG. 2, every node A-G can communicate only one flow at a time, due to the single radio transceiver constraint. For example, flows $F_2$ and $F_3$, sharing node E, and flows sharing a physical link between any two nodes in the network generally cannot transmit simultaneously.

Local schedules need not be synchronized on a slot basis. In fact, each local schedule may be defined with respect to each node's own native clock tick. When a node switches channel as slave, however, it often must use a slot in its local schedule to align to the time reference of the new channel master.

Generally, communication is successful and conflict-free on a flow f only if both endpoint nodes assign time-overlapping slots in their local schedules. More specifically, for most successful, conflict-free communication on x consecutive full-duplex slots, the master typically must allocate x consecutive slots, while the slave commonly must allocate at least x+1 consecutive slots that overlap in time with the ones in the master's local schedule.

The slot in the local schedules are typically assigned in such a way that conflict-free transmissions, as defined above, are always guaranteed for every flow in the network. When there is such perfect coordination by all link endpoints, transmissions on flows always happen on different point-to-point channels and, therefore, there are no transmission conflicts due to unintended broadcast transmissions. This is due to the multi-channel nature of the system.

Given a conflict-free network schedule of period T, the fraction of slots assigned to each link flow f in the local periodic schedule of the master endpoint, determines the rate allocated to this flow by the network. It should, however, be noted that since the slave commonly wastes a slot when it aligns itself to the time reference of the master, the slave will assign more slots in its local schedule for this flow. However, if the system supports a global slot synchronization mechanism, no such slots will be wasted.

Having described the representative ad hoc network architecture illustrated in FIG. 2, we now describe a representative protocol for a system that supports a global slot synchronization mechanism.

Representative Distributed Coordination Mechanism

The protocol description is initiated with a discussion of the generic distributed coordination mechanism mentioned above. An overview of the control packets and data structures, which are datagrams that are typically used for the coordination, is presented first. Then, the inner workings of a representative mechanism according to certain embodiments of the present invention are discussed in detail.

A. Datagram Formats

The above-discussed system half-duplex mini-slots carry datagrams, usually either in the form of data or control packets. All datagrams usually have a common header, which usually include two fields. The first field normally indicates the type of the control packet or if the packet contains data. Then, the second field generally indicates whether the node that originated the datagram is currently engaged in a rate adjustment.

Control packets generally contain incremental information that informs or instructs nodes of how to modify their local link schedules. More specifically, the protocol commonly supports the following types of control packets:

1) Rate Update (RT_UPD) control packets: A rate update packet sent from node i to node j usually informs the recipient j that the rate of a flow f on link (i; j) should be increased or decreased by a certain amount of slots. This type of packet also normally contains a bit vector indicating the positions in the local schedule Si where node i is currently idle. This information can help the receiver node j on its decision of which slots to update for flow f of link (i; j). Usually, an RT_UPD packet related to flow f sent by node i to node j has the following information:

FID ($[\log_2 F_{max}]$ bits): The id of the flow f in question.

DIR (1 bit): Whether the requested adjustment refers to an increase or decrease of the flow rate.

AMOUNT ([$\log_2 T$] bits): The amount of rate adjustment (in slots) requested by node i.

IDLE_VEC (T bits): A bit vector indicating the idle slot positions in the local link schedule Si of the sender node i.

2) Schedule Update (SC_UPD) control packet: An SC_UPD packet sent from node i to node j generally instructs the receiver node j to modify its local schedule. The modification is typically summarized in a T-bit vector indicating the positions that need to be changed in the local schedule of the receiver with respect to a flow f of link (i; j). Usually, if the schedule update is for a rate increase, the receiver j will assign the indicated positions to flow f. However, if the packet specifies a rate decrease, these slot positions will be set as idle.

Commonly, an SC_UPD packet sent by node i to node j contains the following information:

FID ([$\log_2 F_{max}$] bits): The id of the flow f in question.

DIR (1 bit): A direction field specifying if the packet is an "increase" (termed as "SC_UPD_inc") or "decrease" (termed as "SC_UPD_dec") SC_UPD packet.

MODIFY_VEC (T bits): A bit vector indicating the slot positions to be modified in the local link schedule of the receiver node j.

The RT_UPD control packet consists of $4+1+[\log_2 F_{max}]+T+[\log_2 T]$ bits while the SC_UPD packet consists of $4+1+T+[\log_2 T]+[\log_2 F_{max}]$ bits. If the 4 bits of the common header are included, the requirement (in bits) per control packet is:

$$B_{control} = 5 + [\log_2 F_{max}] + [\log_2 T] + T \text{ bits} \quad (1)$$

Since a slot can carry either a data or control datagram, the above equation sets the minimum (excluding FEC, headers, etc) half-duplex mini-slot size in the system or equivalently and the maximum period T that can be supported if the slot size of the system is fixed.

B. Protocol Local Variables

According to certain embodiments of the present invention, every node maintains BUSY_BIT (1 bit) and LOCK_VEC (T bits) local variables. These variables guarantee that modifications resulting from simultaneous link rate adjustments will always maintain the conflict-free property of the network schedule.

BUSY_BIT (1 bit): The current state of this variable is copied to the BBIT field of every datagram (be it control or data) sent out by this node. A value of "1" generally denotes that this node is currently busy on a rate adjustment. However, other values may also be used.

LOCK_VEC (T-bits): This T-bit vector indicates the slot positions to be modified during the schedule adjustment. Commonly, it is used as a filter to incoming SC_UPD_dec packets specifying other rate adjustments. Its function will be explained shortly.

The Schedule Update Mechanism

The local schedules of the wireless nodes in networks according to certain embodiments of the present invention are updated when network links are activated for adjusting the rate of one of their logical flows. For example, when a flow f of link (i; j) is activated for rate adjustment, the direction (increase or decrease) and amount (in slots) of rate adjustment is typically determined first. Then, one of the link endpoints computes the slot positions that typically must be modified in order to reflect this change and sends them to the other end of the link.

If the rate adjustment is for a rate decrease, the indicated slot positions are assigned as idle in the local schedules of both endpoints and the rate adjustment is complete. If the rate adjustment is for a rate increase, these slot positions may have been borrowed from other links adjacent to both node endpoints. In the latter case, the endpoints request from their affected neighbors to set the corresponding slot positions as idle in their own local schedules and then the endpoints wait for acknowledgments from the neighbors.

When both node endpoints receive all necessary acknowledgements from their affected neighbors, the endpoints assign the slot positions to link flow f in their local schedules and the rate adjustment is complete.

The above process is now described in greater detail by way of a representative example. According to this example, it is assumed that node i receives a request for a rate adjustment of flow f on link (i; j). This request is often triggered either by a timer expiration or an explicit asynchronous request coming from a higher layer.

At this point, first node i inspects the BBIT field on the incoming packets from the other link endpoint j. If BBIT=1, then j is generally currently engaged on a rate adjustment with another of its neighbor nodes. Therefore, i waits until that rate adjustment ends. When the received BBIT field from j becomes zero, the rate adjustment may begin and, according to certain embodiments of the present invention, the following steps are performed:

1) Node i initiates the rate adjustment process by sending an RT_UPD packet to the other link end. Also node i sets its BUSY_BIT internal state to 1, or another flag value. This state is copied to every outgoing packet (BBIT field of the common header) of this node and denotes that the node is currently unavailable for a rate adjustment for another flow.

2) Node j receives the RT_UPD packet from node i and sets its BUSY_BIT internal state to 1, or another flag value. j then responds to i with an RT_UPD packet of its own.

3) The exchanged RT_UPD packets typically contain the endpoints' requested rate adjustment directions (either as an increase or decrease) and amounts (in number of slots). Then, based on the exchanged information of the RT_UPD packets, the nodes decide on the direction (increase or decrease) and amount of the adjustment and, one of the nodes is designated as the ASSIGNOR and the other as the ASSIGNEE.

4) At this point, according to certain embodiments of the present invention, using the T-bit IDLE_VEC field information in the RT_UPD packet of the ASSIGNEE, the ASSIGNOR node performs a slot assignment algorithm. This algorithm typically outputs the exact slot positions that must be modified in the endpoints' local schedules in order to reflect the rate adjustment. If the adjustment is in the form of a rate decrease, these slots are assigned as idle. However, if the adjustment is for a rate increase, these slots are assigned to flow f. Then, the output of the slot assignment algorithm is typically stored in a T-bit vector, referred to herein as LOCK_VEC. According to certain embodiments, an entry of "1" in this vector indicates that this slot should be modified at the end of the rate adjustment process.

5) At this point, the ASSIGNOR node generally sends to the ASSIGNEE node an SC_UPD packet that contains the list of slot positions to be modified and waits for an acknowledgment.

6) The ASSIGNEE node then receives the SC_UPD packet from the ASSIGNOR node. For a rate decrease, the ASSIGNEE node assigns the appropriate slot positions as idle in its local schedule and sends an SC_UPD_ACK back to the ASSIGNOR node. Then, the schedule adjustment is complete for the ASSIGNEE node and the ASSIGNEE node moves on to step 11, described below.

For a rate increase, the ASSIGNEE node stores this list to its own LOCK_VEC and sends an SC_UPD_ACK datagram back to the ASSIGNOR node. The slot positions indicated in LOCK_VEC may require reassignment of slots currently assigned to other links adjacent to the ASSIGNEE node. The ASSIGNEE node sends SC_UP-D_dec datagrams to its affected neighboring nodes, instructing the neighboring nodes to set their affected slot positions to idle. Then, the ASSIGNEE node waits for acknowledgements from the neighboring nodes.

7) Following the above steps, the ASSIGNOR node receives the SC_UPD_ACK datagram from the ASSIGNEE node. For a rate decrease, the ASSIGNOR node assigns the slot positions in LOCK_VEC as idle in its local schedule, thereby completing the schedule adjustment for this node, and the ASSIGNOR node moves on to step 11. For a rate increase, however, the ASSIGNOR node sends SC_UPD_dec datagrams to its own affected neighbor nodes, based on LOCK_VEC, and waits for acknowledgements.

8) The link endpoint A that receives first the SC_UPD_dec_ACK datagrams from all the affected neighbors sends a COMMIT_READY packet to the other link endpoint B.

9) When B receives the COMMIT_READY packet, as well as all the SC_UPD_dec_ACKs from its own affected neighbors, endpoint B sends back to endpoint A a COMMIT_READY_ACK datagram. It then assigns to flow f on link (i; j) the slot positions indicated on its LOCK_VEC structure. At this point the schedule adjustment is complete for this node and it moves on to step 11.

10) Upon reception of the COMMIT_READY_ACK datagram, endpoint A assigns to flow f on link (i; j) the slot positions indicated on its own LOCK_VEC structure. At this point the schedule adjustment is complete for this node and it moves on to step 11.

11) After all of the above has been accomplished, both link endpoints A, B and their possible affected neighbors have updated their local schedules with respect to flow f. Thus, the endpoint node resets its BUSY_BIT state to 0 and therefore becomes available for the rate adjustment of another adjacent flow. Also, every entry in LOCK_VEC is typically reset to zero (LOCK VEC[i]=0) and the rate adjustment of flow f is complete.

According to certain embodiments, flow f will be again activated for a rate adjustment after a number of $R_f$ slots. This number may be chosen at random or may be constant and it is typically computed by one of the link endpoints. For a rate decrease, $R_f$ is normally computed by the ASSIGNEE node at the end of step 6. For a rate increase, $R_f$ is commonly computed by "node B" at the end of step 9. After step 11 of the rate adjustment, this node will wait for $R_f$ transmissions on flow f, and then it will initiate the rate adjustment for this flow by sending an RT_UPD datagram to the other end.

The above-described use of BUSY_BIT and LOCK_VEC local variables guarantees simultaneous conflict-free local schedule modifications. The BUSY_BIT variable and BBIT datagram field ensure that when a link is activated for rate adjustment, the endpoint nodes of that link will not initiate an adjustment with other neighbor nodes.

However, the endpoint nodes can still receive SC_UPD_dec control datagrams due to a rate adjustment that involves other neighbors as link endpoints. Under such conditions, the MODIFY_VEC T-bit field of an incoming SC_UPD_dec packet indicates slot positions to be set as idle in the local schedule of the receiving node. The receiving node filters these positions using its LOCK_VEC variable. If the node is currently engaged in a rate adjustment, it will assign as idle only the indicated positions in MODIFY_VEC that are not set to "1" in the current LOCK_VEC. If the node receives an SC_UPD_dec datagram when it is not engaged in a link rate adjustment all entries in LOCK_VEC will typically be zero and, therefore, all slots indicated in the received MODIFY_VEC can be assigned to idle.

Representative Bandwidth Allocation for Quality of Service (QoS)

The distributed coordination scheme discussed above provides the basis for bandwidth allocation mechanisms for reaching desired link rate allocations in a network according to certain embodiments of the present invention. However, in order to properly allocate bandwidth for QoS guarantees, regions of feasible link bandwidth allocations still have to be defined for a multi-channel ad hoc network, and any optimal bandwidth allocation should lie within this region. Also, focusing on those feasible allocations that are optimal in the Max Min Fair (MMF) sense is still desired in order to provide a bandwidth allocation algorithm for achieving this Quality of Service objective.

Rate Feasibility

A fluid model is now used to describe the feasibility of bandwidth allocations in a multi-channel ad hoc network. However, it should be noted that this model captures the channel sharing constraints without taking into account the conflict-free transmission requirements at the slot level.

According to the fluid model, the rate (normalized bandwidth) $r_f$ of a link flow f in an ad hoc network is the fraction of conflict-free slots allocated to flow f in a T-periodic schedule. A bandwidth allocation of flows $R=(r1, \ldots, r_f, \ldots r_{F|})$ is called feasible if there exists a conflict-free schedule that allocates to every flow f a rate equal to $r_f$.

Feasible allocations may be characterized by a set of constraints as described below. The effective capacity of a node i is the maximum normalized bandwidth this node provides its flows for communication and F(i) is defined as the set of adjacent flows to node i. Since, as discussed above, a node in a network according to certain embodiments of the present invention cannot communicate on different flows simultaneously, the sum of the rates of all flows in F(i) must be less than the node capacity. Therefore, the following node capacity constraint for feasibility exists:

$$\sum_{f \in F(x)} r_f \leq C_i, \forall_i \in N, \text{ where}$$

$$C_i = \left\{ \frac{1\_if\_network\_graph\_G\_is\_bipartite}{2/3\_otherwise} \right.$$

If a flow f has a long-term arrival rate $B_f$, a demand constraint on the maximum allowable rate for this flow is defined as:

$$r_f \leq B_f$$

Max Min Fairness (MMF)

Max Min Fairness (MMF) is an intuitive and desirable objective in application scenarios where no explicit knowledge exists about the bandwidth requirements of the users in the network. This type of allocation is particularly useful when users do not have strict traffic demands or for the case of applications that comply to the best-effort service model. For example, FTP and TELNET applications are suited for MMF.

A MMF algorithm typically attempts to allocate an equal amount of bandwidth to all flows. However, if a flow cannot use all the bandwidth available because of a constraint, then the residual bandwidth is distributed to less constrained flows. Hence, among any feasible bandwidth allocations, a MMF allocation ensures that the most constrained flows are allotted the maximum possible bandwidth.

Figure 3:
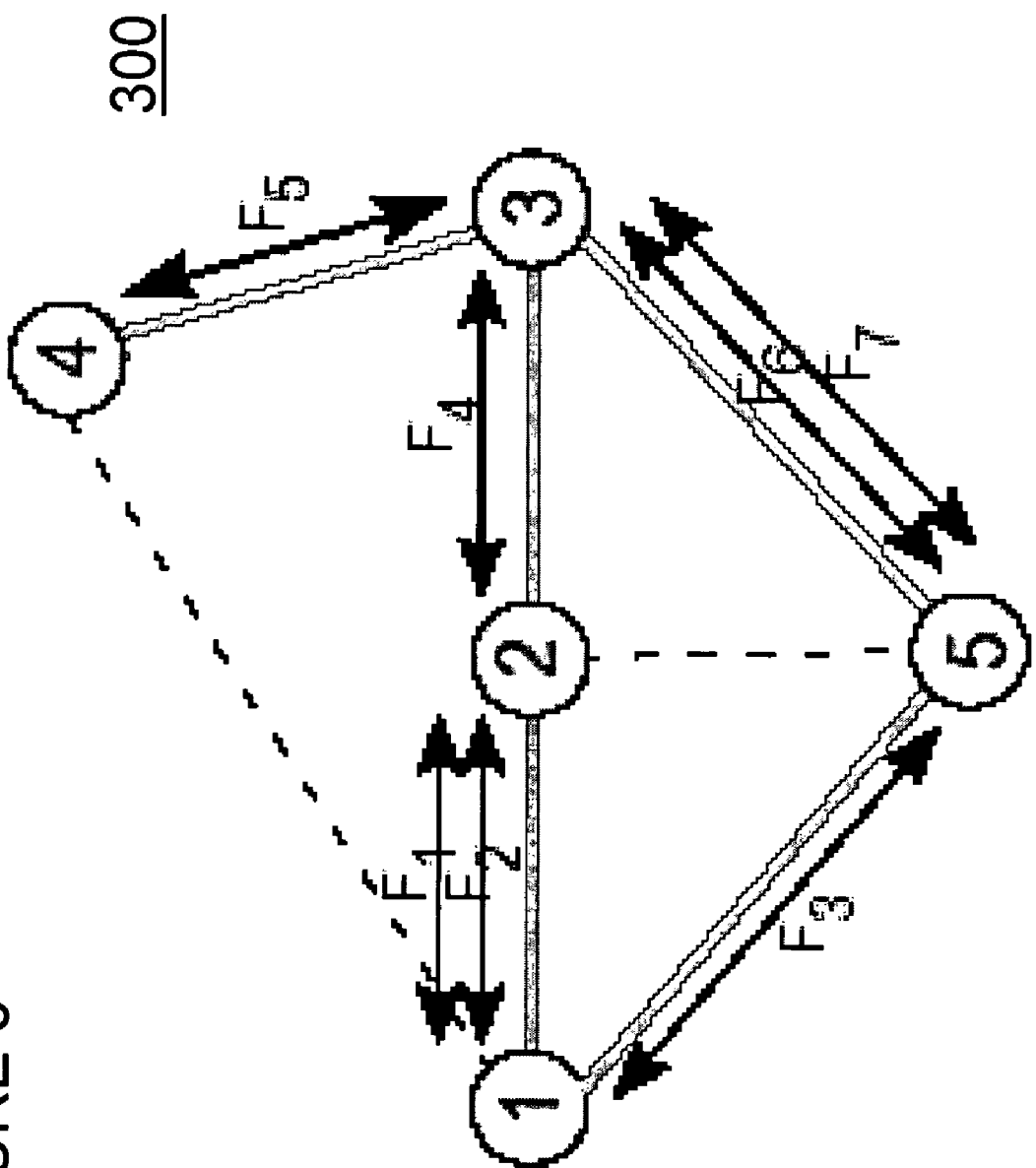
FIG. 3 illustrates a second small network according to certain embodiments of the present invention.

A feasible rate allocation is said to be MMF if the rate allocated to a flow cannot be increased without hurting other flows having equal or lesser rates. In FIG. 3, for example, which illustrates a second small network 300 according to certain embodiments of the present invention, the MMF allocation of flows is $(r_{F1}, r_{F2}, r_{F3}, r_{F4}, r_{F5}, r_{F6}, r_{F7}) = (1/3, 1/3, 1/3, 1/4, 1/4, 1/4, 1/4)$. Because node 3 is fully utilized, the rate of 1/4 allocated to flow $F_4$ cannot be increased without hurting the rates of the flows $F_5$, $F_6$, and $F_7$ that share node 3 and have been assigned an equal rate.

Given a feasible rate allocation on a network, it is very useful to have a distributed criterion to test if this allocation is MMF or not. A node i is defined as a bottleneck node of flow f if the sum of the rates of all flows equals the node effective capacity Ci and the rate of flow f is greater than or equal to the rate of all other link flows in F(i).

MMF criterion: A bandwidth allocation is MMF if and only if every flow f satisfies at least one of the following conditions:

1) The bandwidth allocated to the flow equals its long-term arrival rate $B_f$.
2) The flow f has at least one bottleneck node.

For the example in FIG. 3 we can easily verify that nodes 1 and 3 are the bottleneck nodes for the flow sets F1, F2, F3 and F4, F5, F6, F7 respectively.

A Distributed Fluid Algorithm for Computing the MMF Rates

Discussed below is a representative asynchronous distributed algorithm according to certain embodiments of the present invention. This algorithm may be used, for example, in conjunction with the fluid model that works in the feasible rates region and eventually converges to the MMF solution.

The representative algorithm starts from an arbitrary feasible rate allocation R in the network. At asynchronous points in time, each link in the network is activated (i.e., undergoes a rate adjustment process) for a possible rate adjustment of one of its flows. According to certain embodiments of the present invention, the adjustment is such that at least one of the link endpoints becomes a bottleneck node for the flow.

A bottleneck node may be created if the rate of the flow increases so that the node in question gets a rate greater than or equal to the rate of the other flows sharing that node. The amount of this rate increase is called the fairness deficit and is typically computed by the fairness deficit computation (FDC) algorithm.

Figure 7:
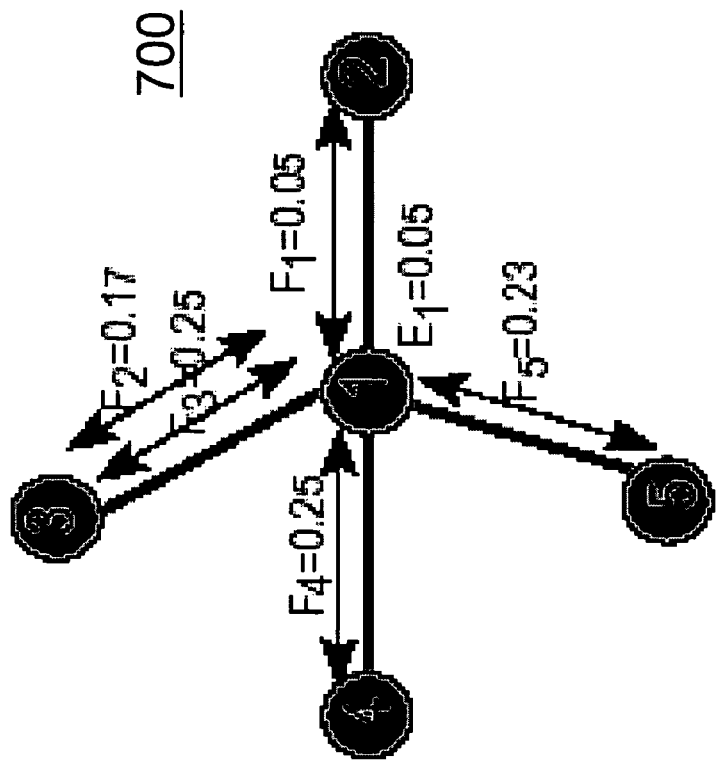
FIG. 7 illustrates a fourth small network according to certain embodiments of the present invention and a table that illustrates the rates of the flows across the network after several steps of an FDC algorithm have been performed on the network.

The rate allocation of node i is the set $r_i = \{r_f : f \in F(i)\}$ of rates allocated to its adjacent link flows. Starting from $r_i$, the FDC algorithm for flow f finds a new allocation $r_i'$ in which the rate $r_f'$ belongs to the maximum rate set. Then, the fairness deficit $fd^{(i)}_f$ of node i with respect to f is equal to $r_f' - r_f$. FIG. 7 includes a table 710 that is a representative example of the steps of an FDC algorithm operation according to certain embodiments of the present invention for the network 700 illustrated therein.

When a flow f on link (i, j) is asynchronously activated for rate adjustment, the following actions are performed:

1) Nodes i and j compute their fairness deficits $fd^{(i)}_f$ and $fd^{(j)}_f$ on flow f and exchange their deficit values. The link fairness deficit is calculated as $fd_f = \min\{fd^{(i)}_f, fd^{(j)}_f\}$.
2) If the link fairness deficit is zero, then no rate adjustment takes place, the next steps are not executed, and no further action is taken.
3) If both deficits are non-zero, then the rate of flow f is increased by $fd_f$.
4) Nodes i and j adjust the rates of the rest of their adjacent links accordingly. If i is the minimum deficit node, then its new link rate allocation $r_i'$ is the one given by the FDC algorithm of $fd^{(i)}_f$ in step 1. The maximum deficit node j reaches its new link rate allocation $r_j'$ by again applying the FDC on flow f with an upper bound constraint of $r_f + fd_f$.

It should be note that, in order to do the above adjustments, only the rates of certain flows adjacent to nodes i and j are reduced, though the rate of flow f is increased by $fd_f$.

It should also be noted that, given a static topology and an arbitrary initial feasible network rate allocation R, the above algorithm converges to the network MMF solution after a finite number of flow activations for rate adjustment.

Pursuant to this convergence, the algorithm termination is totally distributed and no explicit message needs to be sent to the entire network to signal convergence. Then, when a link is activated for possible rate adjustment, its rate is adjusted only if the link fairness deficit is non-zero.

Mapping the Fluid Algorithm to the Schedule Update Mechanism of the Slotted System The fluid algorithm according to certain embodiments of the present invention guarantees convergence to the network MMF rates but does not yield a conflict-free schedule that realizes these rates. This is because the fluid model does not refer to a slotted system but is only concerned about how to redistribute the bandwidth.

Hence, discussed below is how the bandwidth allocation algorithm may be directly mapped to the steps of the generic schedule update mechanism discussed above.

When a link (i, j) is asynchronously activated for a possible rate increase of one of its flows f, the following steps may be performed, according to certain embodiments of the present invention:

Steps 1-2: The node endpoints compute their fairness deficits and exchange them through RT_UPD packets. If the FDC algorithm of node i yields a rate increase of $fd^{(i)}_f$, the amount of slots in the RT_UPD packet sent from i to j is $\lceil fd^{(i)}_f T \rceil$.

Step 3: The exchanged RT_UPD packets contain the endpoints' requested rate adjustment directions (e.g., increase) and amounts (i.e., the fairness deficits). The minimum deficit node is the one with the smaller deficit or, in the case of equal deficits, the one with smaller id. Based on the exchanged information of the RT_UPD packets:

The rate of flow f is generally increased by the link flow fairness deficit of $\min(|fd^{(i)}_f T|, |fd^{(j)}_f T|)$ slots. If the deficit is zero, no rate adjustment takes place and nodes move to the final step 11. The minimum deficit node computes the amount of slots $R_f$, after which flow f will again be activated for rate adjustment.

If the deficit value is non-zero, the minimum deficit node is designated as the ASSIGNOR node and the other node as the ASSIGNEE node.

Step 4: The ASSIGNOR node decides on the slot positions that will be assigned to flow f using the slot assignment algorithm defined above. These positions are typically stored in a LOCK_VEC local variable. (The slot assignment algorithm is discussed).

Steps 5-11: Given the positions in LOCK_VEC, the corresponding conflict-free schedule modifications are propagated and applied as in steps 5-11 of the schedule update mechanism described above for the case of a rate increase.

The MMF Slot Assignment Algorithm

Generally, according to certain embodiments of the present invention, node i may be chosen as the ASSIGNOR endpoint node performing the slot assignment algorithm for flow f of link (i, j). In order to determine the slot positions for flow f the ASSIGNOR node uses the following information:

Difference vector $x_i$: During the fairness deficit computation step, node i has computed a new rate allocation $r_i'$ from $r_i$.

According to this new allocation, the rate of flow f may be increased, and the rate of some flows may be decreased.

If $\tau_i=[r_iT]$ and $\tau_i'=[r_i'T]$ are the corresponding slot allocations, the difference vector denotes the affected flows and, for each one of these flows, the amount of slots that is preferably provided in order to give the fairness deficit amount of slots to flow f Given $x_i$, a positive (negative) element $x_k$ means that the rate of flow k should be increased (decreased) by $x_k$ slots. A zero element indicates no change in the rate of the corresponding flow.

The set of surplus flows (i.e., the flows that will be affected by the rate increase on flow f) is $X_i^-=\{k: x_k<0\}$. Also $x_f$ is positive and equal to the fairness deficit amount of slots that must be assigned to flow f IDLE_VEC of the ASSIGNEE node: The IDLE_VEC field in the RT_UPD packet previously received by the other endpoint node indicates the slot positions where that node is currently idle. This information serves as a hint as to which slot positions should be preferable for assignment.

Given the above information, the slot assignment algorithm decides, for each surplus flow k, which $x_k$ out of the $\tau_k$ current slot positions of flow k will be re-assigned to flow f.

The algorithm typically includes two phases. In Phase I, node i generally takes into account the link schedule of node j and assigns slot positions to flow f in the following prioritized way:

1) First, f is assigned slot positions that are currently idle in both link schedules $S_i$ and $S_j$, if such positions exist.

2) If step 1 did not find enough matching slot positions, f is assigned slot positions where j is idle and i currently uses a surplus flow k, if such positions exist.

The number of slot positions that matched during phase I may still be less than the required deficit for flow f For each surplus flow k for which Phase I selected only $m_k$ out of $x_k$ slots, Phase II randomly selects extra $x_k-m_k$ slot positions that are still assigned to flow k in $S_i$ and reassigns them to flow f The algorithm outputs a bit vector LOCK_VEC indicating the extra slot positions that should be assigned to link flow f

AN EXAMPLE

Figure 4:
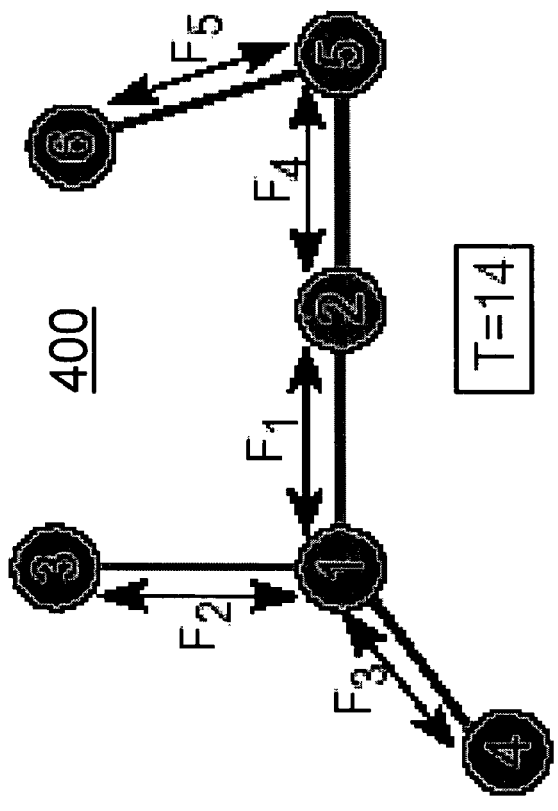
FIG. 4 illustrates a third small network according to certain embodiments of the present invention wherein the network uses a T=14 periodic conflict-free schedule.

FIG. 4 illustrates a third small network 400 according to certain embodiments of the present invention wherein the network uses a T=14 periodic conflict-free schedule. FIG. 4 also includes a table that illustrates which slot positions, if any, are idle for each node on the network In the ad hoc network operating according to the periodic schedule of FIG. 4. Link (1, 2) may be activated for rate adjustment of flow $F_1$. Under such conditions, the node endpoints compute the fairness deficits with respect to $F_1$ and the fairness deficit computation of node 1, as depicted in the table 500 in FIG. 5.

The resulting fairness deficit of node 1 is 4 slots. Similarly, the fairness deficit of node 2 for $F_1$ is 5 slots. Nodes 1 and 2 exchange their deficit values during the RT_UPD packet handshake. The minimum deficit node is node 1 and, therefore, it will be the ASSIGNOR. FIG. 6 includes a table 600 that depicts the local schedules of nodes 1 and 2 when node 1 performs the slot assignment algorithm. The rate difference vector x, (row 5 in table 500 in FIG. 5) indicates that flows $F_2$ and $F_3$ must give away two slots each and flow $F_1$ should be assigned four extra slots. By matching the idle slots of $S_2$, node 1 reassigns slot positions {7, 12} from $F_2$ and {11, 13} (selected randomly from {0, 11, 13}) from $F_3$ to link $F_1$.

Figure 8:
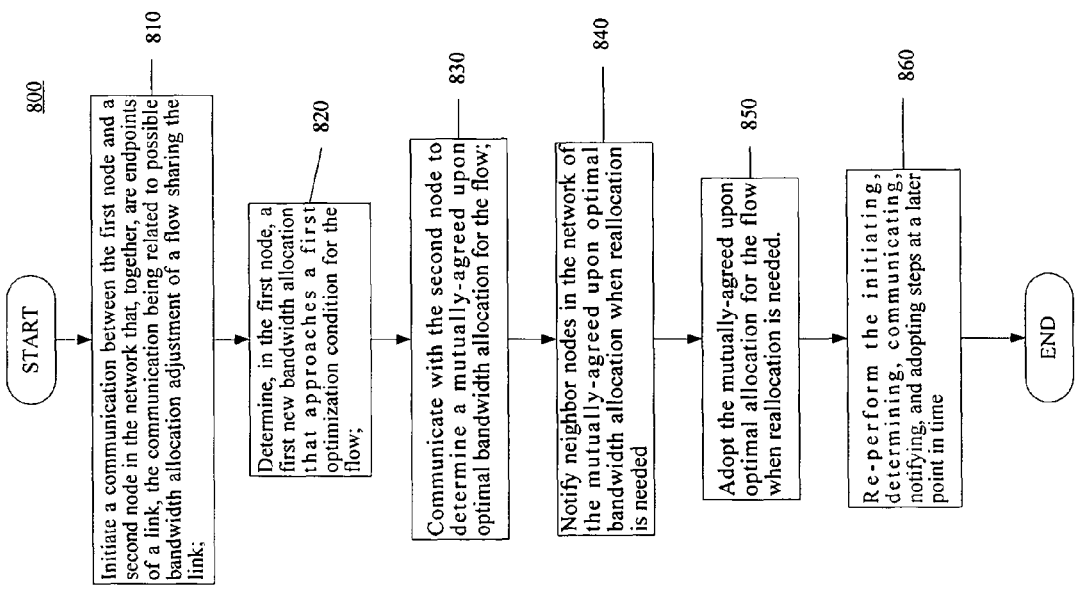
FIG. 8 illustrates a flowchart that includes the steps of a representative method of allocating bandwidth in a network according to certain embodiments of the present invention.

FIG. 8 illustrates a flowchart that includes the steps of a representative method 800 of allocating bandwidth in a first node that is operable in an ad hoc, wireless network configured to support at least one guaranteed feasible flow allocation according to certain embodiments of the present invention. In FIG. 8, step 810 recites initiating a communication between the first node and a second node in the network that, together, are endpoints of a link, the communication being related to possible bandwidth allocation adjustment of a flow sharing the link, step 820 recites determining, in the first node, a first new bandwidth allocation that approaches a first optimization condition for the flow, step 830 recites communicating with the second node to determine a mutually-agreed upon optimal bandwidth allocation for the flow, and step 840 recites notifying neighbor nodes in the network of the mutually-agreed upon optimal bandwidth allocation when reallocation is needed. In addition, step 850 recites adopting the mutually-agreed upon optimal allocation for the flow when reallocation is needed and step 860 recites re-performing the initiating, determining, communicating, notifying, and adopting steps discussed above at a later point in time.

According to certain embodiments of the present invention step 820 includes determining, in the first node, a first new bandwidth allocation that approaches at least one of a Max Min Fair condition and a Quality of Service guarantee condition, which are among the optimization conditions for the network. According to certain other embodiments of the present invention, step 810 includes initiating a communication between the first node and the second node in a slotted, ad hoc, wireless network. According to yet other embodiments of the present invention, step 810 includes initiating a communication between the first node and the second node in a network on which a Time Division Multiple Access (TDMA) schedule is implemented.

Figure 9:
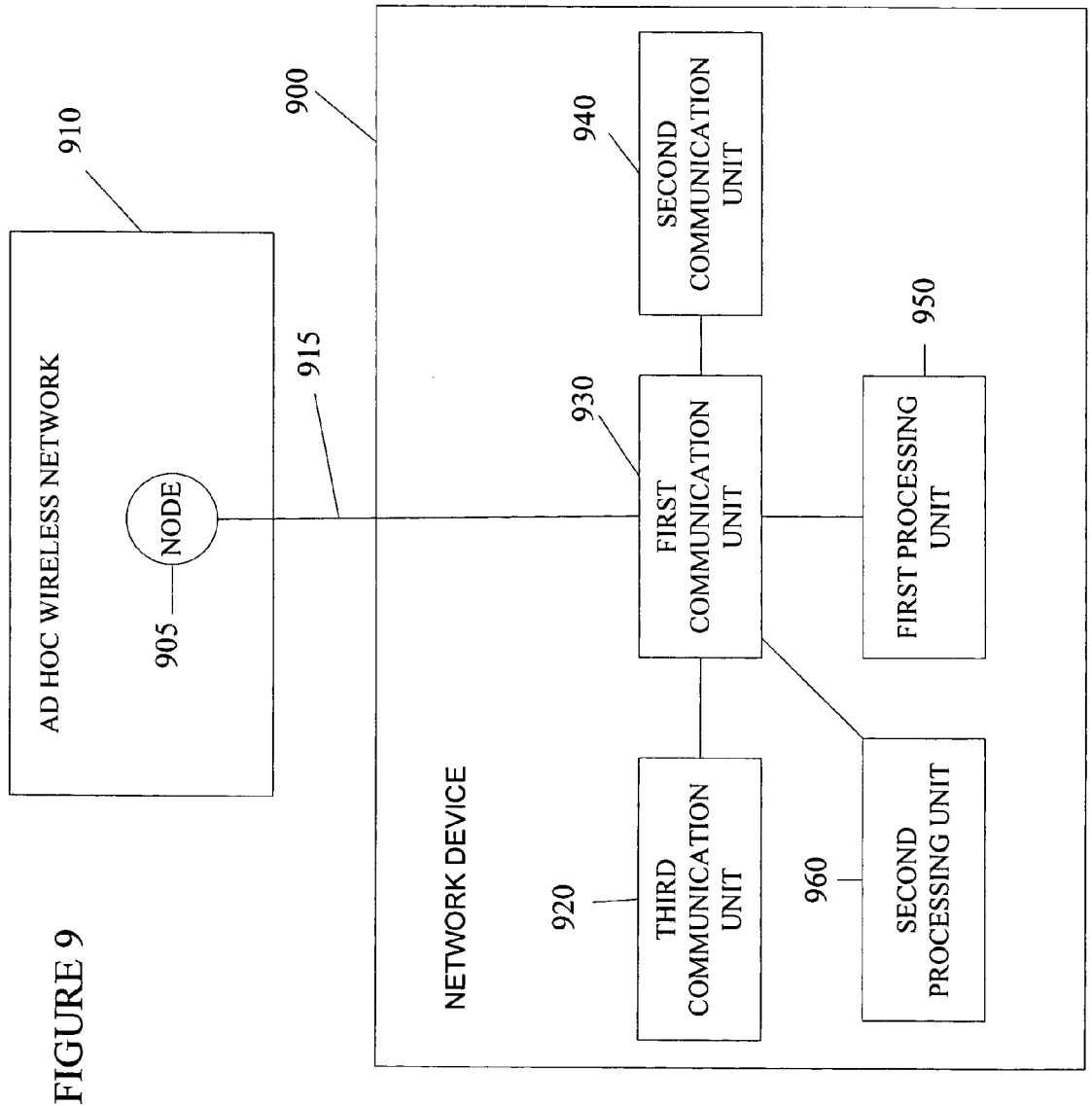
FIG. 9 illustrates a representative network device configured to allocate bandwidth in a network according to certain embodiments of the present invention.

FIG. 9 illustrates a representative network device 900 configured to allocate bandwidth in an ad hoc, wireless network 910 configured to support at least one guaranteed feasible flow allocation. As illustrated in FIG. 9, device 900 includes a first communication unit 930 that is configured to initiate a communication between device 900 and a node 905 in network 910 that, together, are endpoints of a link 915 in network 910, the communication being related to possible bandwidth allocation adjustment of a flow sharing link 915. Device 900 also includes a first processing unit 950 configured to determine a first new bandwidth allocation that approaches a first optimization condition for link 915, wherein first processing unit 950 is operably connected to first communication unit 930. Also, device 900 includes a second communication unit 940 that is configured to communicate with node 905 to determine a mutually-agreed upon optimal bandwidth allocation for the flow, wherein second communication unit 940 is operably connected to first communication unit 930. Further, device 900 includes a third communication unit 920 configured to notify neighbor nodes (not illustrated) in network 910 of the mutually-agreed upon optimal bandwidth allocation when reallocation is needed, wherein third communication unit 920 is operably connected to first communication unit 930. Device 900 also includes a second processing unit 960 configured to adopt the mutually-agreed upon optimal allocation for the flow when reallocation is needed, wherein second processing unit 960 is operably connected to first communication unit 930.

Figure 10:
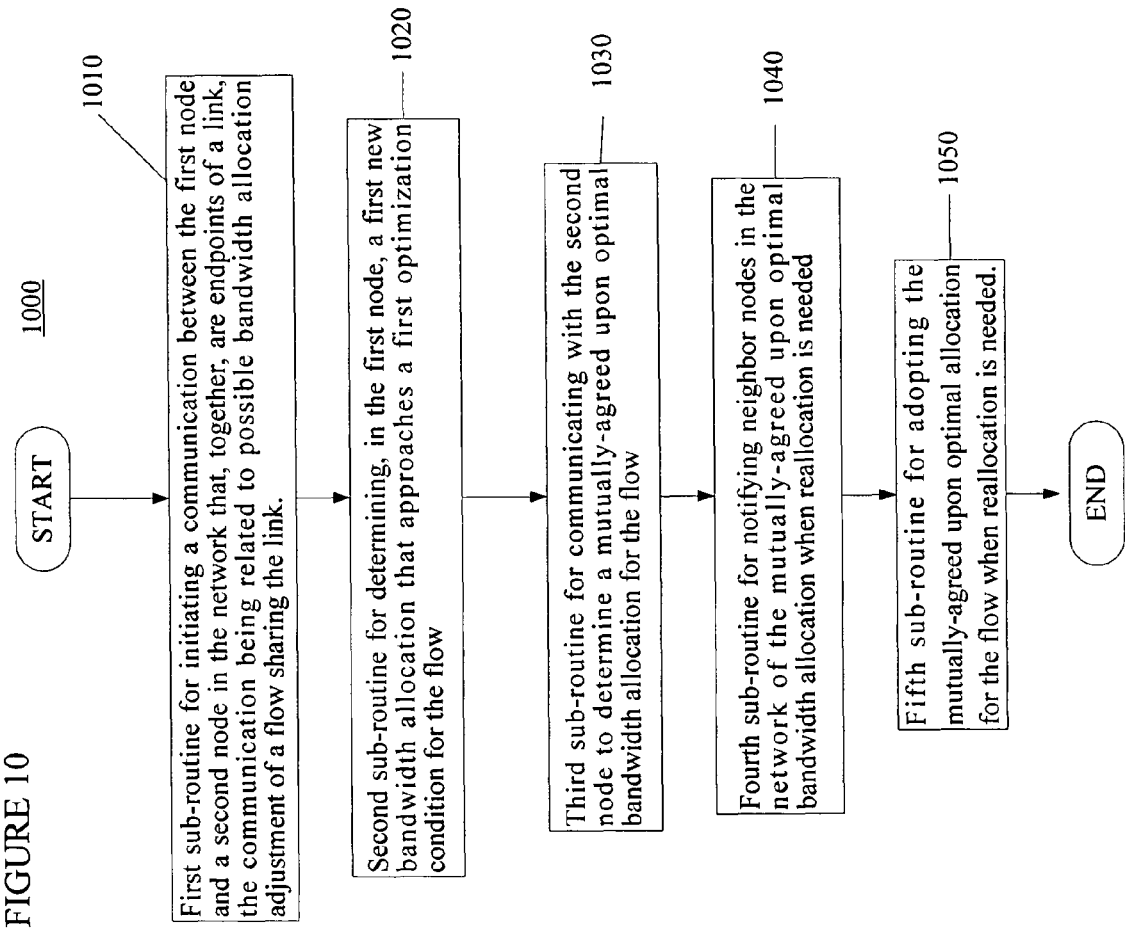
FIG. 10 illustrates the subroutines of a computer program embodied on computer-readable media and configured to allocate bandwidth in a network according to certain embodiments of the present invention.

FIG. 10 illustrates a flowchart 1000 that includes the subroutines of a computer program according to certain embodiments of the present invention that may be embodied on computer-readable media, with the computer program typically configured to allocate bandwidth in an ad hoc, wireless network configured to support at least one guaranteed feasible flow allocation. As shown in FIG. 10, flowchart 1000 includes a first sub-routine 1010 for initiating a communication between the first node and a second node in the network that, together, are endpoints of a link, the communication being related to possible bandwidth allocation adjustment of the link and a second sub-routine 1020 for determining, in the first node, a first new bandwidth allocation that approaches a first optimization condition for a flow sharing the link. Flowchart 1000 also includes a third sub-routine 1030 for communicating with the second node to determine a mutually-agreed upon optimal bandwidth allocation for the flow and a fourth sub-routine 1040 for notifying neighbor nodes in the network of the mutually-agreed upon optimal bandwidth allocation when reallocation is needed. Further, flowchart 1000 includes a fifth sub-routine 1050 for adopting the mutually-agreed upon optimal allocation for the flow when reallocation is needed.

The Case of BLUETOOTH

The protocol was described for a generic system that is synchronized on a slot basis. Such a mechanism is not supported in BLUETOOTH. Each BLUETOOTH device has its own "native" hardware clock, but different native clocks are not necessarily synchronized. During link formation one node assumes the role of master and the other acts as slave. Masters provide their native clock as the time reference for communication within their channel. Each slave uses the phases with respect to its masters to know the slot boundaries where communication happens in each channel. Our protocol can operate properly even in this setting. The local schedule of a node is with respect to its native clock tick and the node uses it to know which link it can communicate conflict-free for the duration of a slot (either as a master or slave). Also according to the protocol a node is informed by RT_UPD packets about other nodes' local schedules and is instructed by SC_UPD packets to modify its own. Therefore slot positions in an RT_UPD packet refer to the native clock reference of the sender node, while slot positions in an SC_UPD packet refer to the native reference of the receiver node. Each time a control packet is sent on a link, the receiver of an RT_UPD packet (or sender of an SC_UPD packet), can perform the time reference translation on the slot positions in the packet using the corresponding link phase.

Other QoS Bandwidth Allocation Mechanisms

It should be noted that certain embodiments of the distributed coordination mechanism discussed above may be the basis of bandwidth allocation algorithms targeting alternative QoS objectives. Hence, one skilled in the art of the present invention will appreciate that such algorithms would be similar in spirit and implementation to the one presented here and are therefore within the scope of the present invention The framework discussed above may be used to allocate Max Min Fair (MMF) rates to the link flows in the network by providing a distributed bandwidth allocation algorithm targeting for this objective. Other QoS objectives can also be reached, according to certain embodiments of the present invention, by designing an appropriate bandwidth allocation algorithm and integrating it with the generic distributed coordination scheme.

Certain embodiments of the protocol discussed above are fully distributed and can operate even in slotted ad hoc networks that do not support global slot synchronicity, such as BLUETOOTH networks. Certain embodiments of the protocol discussed above also have very low communication and storage requirements that do not depend on the size of the intended ad hoc networks but only on the protocol parameters such as the period T (O(T) bits).

At least in view of the above, protocols such as, but not limited to, those discussed above may be used as crucial building blocks for the deployment of future ad hoc wireless networks that provide Quality of Service to their users.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method of allocating bandwidth in a first node that is operable in an ad hoc, wireless network configured to support at least one guaranteed feasible flow allocation, the method comprising the steps of:

initiating a communication between the first node and a second node in the network that, together, are endpoints of a link, the communication being related to possible bandwidth allocation adjustment of a flow sharing the link;

determining, in the first node, a first new bandwidth allocation that approaches a first optimization condition for the flow;

communicating with the second node to determine a mutually-agreed upon optimal bandwidth allocation for the flow;

notifying neighbor nodes in the network of the mutually-agreed upon optimal bandwidth allocation when reallocation is needed, wherein the neighbor nodes each modify their bandwidth allocation based on the notification; and adopting the mutually-agreed upon optimal allocation for the flow when reallocation is needed, wherein the at least one guaranteed feasible flow allocation comprises at least one flow allocation for which a schedule exists that can realize the at least one flow allocation by taking into account flows in the ad hoc network.

2. The method of claim 1, further comprising the step of: re-performing the initiating, determining, communicating, notifying, and adopting steps at a later point in time.

3. The method of claim 1 wherein the determining step comprises determining, in the first node, the first new bandwidth allocation that approaches at least one of a Max Min Fair condition and a Quality of Service guarantee condition.

4. The method of claim 1, wherein the initiating step comprises initiating a communication between the first node and the second node in a slotted, ad hoc, wireless network.

5. The method of claim 1, wherein the initiating step comprises initiating a communication between the first node and the second node in a network on which a Time Division Multiple Access (TDMA) schedule is implemented.

6. A network device configured to allocate bandwidth in an ad hoc, wireless network configured to support at least one guaranteed feasible flow allocation, the device comprising:

a first communication unit configured to initiate a communication between the device and a node in the network that, together, are endpoints of a link in the network, the communication being related to possible bandwidth allocation adjustment of a flow sharing the link;

a first processing unit configured to determine a first new bandwidth allocation that approaches a first optimization condition for the flow, wherein the first processing unit is operably connected to the first communication unit;

a second communication unit configured to communicate with the node to determine a mutually-agreed upon optimal bandwidth allocation for the flow, wherein the second communication unit is operably connected to the first communication unit;

a third communication unit configured to notify neighbor nodes in the network of the mutually-agreed upon optimal bandwidth allocation when reallocation is needed, wherein the neighbor nodes each modify their bandwidth allocation based on the notification, and wherein the third communication unit is operably connected to the first communication unit; and a second processing unit configured to adopt the mutually-agreed upon optimal allocation for the flow when reallocation is needed, wherein the second processing unit is operably connected to the first communication unit, wherein the at least one guaranteed feasible flow allocation comprises at least one flow allocation for which a schedule exists that can realize the at least one flow allocation by taking into account flows in the ad hoc network.

7. A non-transitory computer readable medium encoded with a computer program to allocate bandwidth in an ad hoc, wireless network configured to support at least one guaranteed feasible flow allocation, which, when executed, is configured to control a processor to perform:

a first sub-routine for initiating a communication between the first node and a second node in the network that, together, are endpoints of a link, the communication being related to possible bandwidth allocation adjustment of a flow sharing the link;

a second sub-routine for determining, in the first node, a first new bandwidth allocation that approaches a first optimization condition for the flow;

a third sub-routine for communicating with the second node to determine a mutually-agreed upon optimal bandwidth allocation for the flow;

a fourth sub-routine for notifying neighbor nodes in the network of the mutually-agreed upon optimal bandwidth allocation when reallocation is needed, wherein the neighbor nodes each modify their bandwidth allocation based on the notification; and a fifth sub-routine for adopting the mutually-agreed upon optimal allocation for the flow when reallocation is needed, wherein the at least one guaranteed feasible flow allocation comprises at least one flow allocation for which a schedule exists that can realize the at least one flow allocation by taking into account flows in the ad hoc network.

8. A network device configured to allocate bandwidth in an ad hoc, wireless network configured to support at least one guaranteed feasible flow allocation, the device comprising:

initiation means for initiating a communication between the first node and a second node in the network that, together, are endpoints of a link, the communication being related to possible bandwidth allocation adjustment of a flow sharing the link;

determination means for determining, in the first node, a first new bandwidth allocation that approaches a first optimization condition for the flow;

determination means for communicating with the second node to determine a mutually-agreed upon optimal bandwidth allocation for the flow;

notification means for notifying neighbor nodes in the network of the mutually-agreed upon optimal bandwidth allocation when reallocation is needed, wherein the neighbor nodes each modify their bandwidth allocation based on the notification; and adoption means for adopting the mutually-agreed upon optimal allocation for the flow when reallocation is needed, wherein the at least one guaranteed feasible flow allocation comprises at least one flow allocation for which a schedule exists that can realize the at least one flow allocation by taking into account flows in the ad hoc network.

* * * * *